Figure 1:
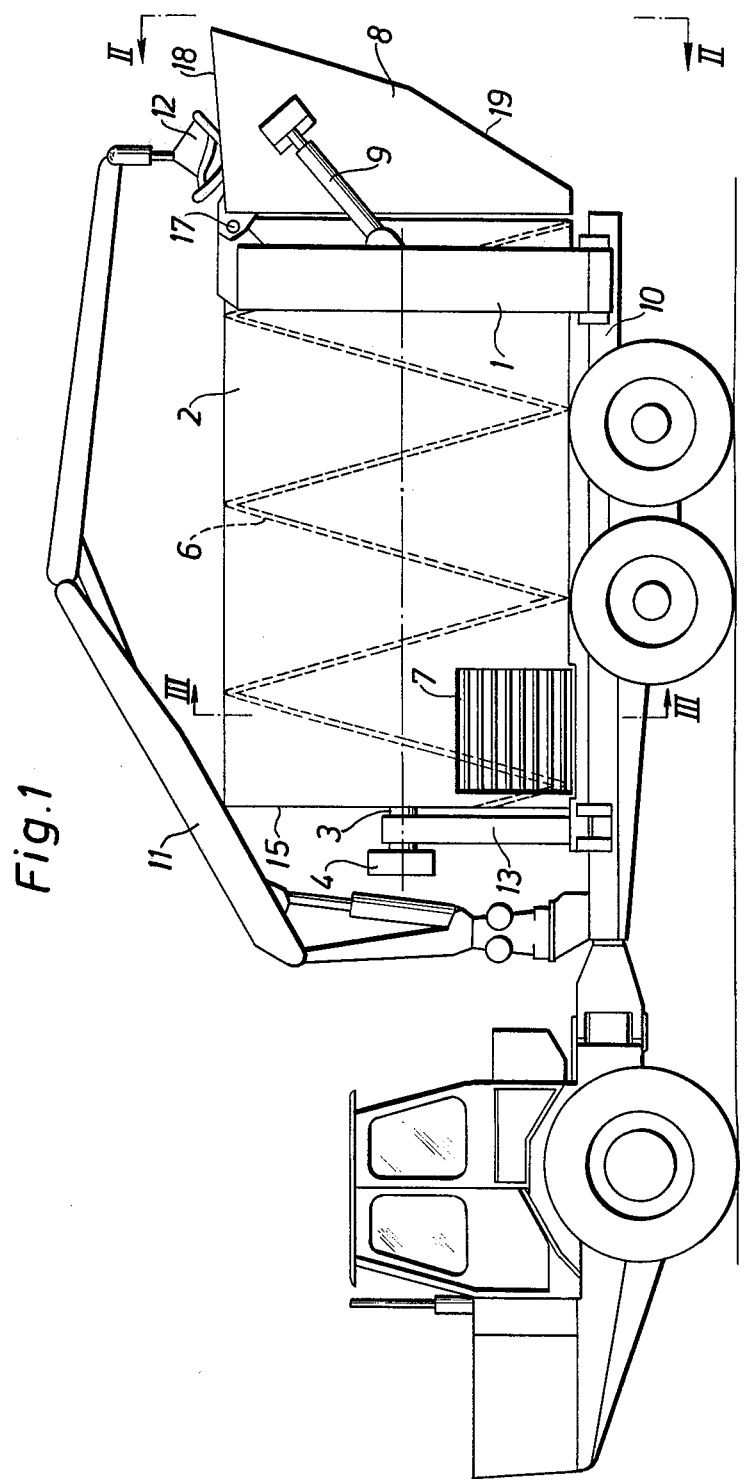

United States Patent [19]

Arnoldsson et al.

[11] 4,254,874
[45] Mar. 10, 1981

[54] DEVICE FOR COLLECTING AND PROCESSING TREE STUMPS

[75] Inventors: Erik Arnoldsson; Lars-Ake Björklund, both of Söderhamn, Sweden

[73] Assignee: Kockums Industri AB, Fack, Sweden

[21] Appl. No.: 29,767

[22] Filed: Apr. 13, 1979

[51] Int. Cl.³ ............................ B03B 1/00; B07B 1/22
[52] U.S. Cl. ........................................ 209/3; 209/297; 144/208 B; 241/101.7
[58] Field of Search .................. 209/3, 270, 279, 280, 209/288, 293, 297, 296, 421; 171/116, 121, 122, 128, 129; 144/208 B, 2 N, 309 AC; 15/305, 90; 241/284, 83, 91, 278 A, 101.7, 79.3

[56] References Cited

U.S. PATENT DOCUMENTS

| | | | |
|---|---|---|---|
| 3,614,003 | 10/1971 | Tremolada | 241/284 X |
| 3,620,369 | 11/1971 | Steen et al. | 209/3 |
| 4,016,978 | 4/1977 | Danna | 209/421 |
| 4,036,440 | 7/1977 | Makila et al. | 209/3 X |
| 4,140,281 | 2/1979 | Fulghum et al. | 209/3 X |

Primary Examiner—Ralph J. Hill

[57] ABSTRACT

A mobile vehicle is provided with a rotatable, motor driven container which has at one end thereof a first opening for both receiving and discharging tree stumps therefrom. A second opening is formed in the container for discharging earth, sand, stones etc. that are entrained in the tree stumps. One or more helical cams longitudinally displace the stumps in the container during the rotation thereof.

19 Claims, 3 Drawing Figures

DEVICE FOR COLLECTING AND PROCESSING TREE STUMPS

Stumps remaining after conventional wood harvesting represent an important quantity of fibre raw material and, consequently, the stumps have lately been exploited to a higher degree for the production of chips. The stumps are extracted from the ground by means of machines according to various methods some of which also comprise separation of the stump into smaller portions or the crushing of the stump. The stump extracting device may be combined with a device for transporting the stump, but frequently the extraction and the collection of the stumps are performed by means of separate equipments.

An inconvenience with stumps as a wood raw material is that the handling and the processing thereof into chips is complicated by earth and stones being entrained at the extraction of the stump, and the removal thereof causes a number of problems.

The basic idea of the present invention is that earth, stones and other loose material entrained with the stump removed from the stump at a phase as early as possible after the extraction of the stump and preferably in connection with the collection of the stumps for further transport to the chip cutting station.

A device according to the present invention for the collection and processing of extracted tree stumps is characterized by a carrier vehicle, a container, rotatably supported on the chassis of the vehicle and adapted to contain a plurality of stumps, and having an opening for loading the stumps into the container and an aperture for discharging the stumps therefrom, as well as motor driven means for bringing the container into rotation.

Preferably the container is elongated and the axis of rotation thereof extends in the longitudinal direction of the container and of the supporting vehicle. The container may be closed at one end, viz., the front end by an end wall, while the opening for charging and discharging the stumps is provided at the opposite, viz. the rear end and adapted to be closed by a removable shutter, which may be provided with an upwardly directed insertion aperture for the stumps and be adapted to guide the stumps into the container. The container may be circularly cylindrical in cross section and be rotatably supported near the ends thereof by means of a combination of runners or rollers engaging the container in a manner known per se, in order to permit maximum size of the charge and discharge opening.

Moreover, the container may be provided with a separate discharge opening for earth, stones etc. released from the stumps and internal means for the displacement of the stumps longitudinally of the container during the rotation thereof.

Figure 3:
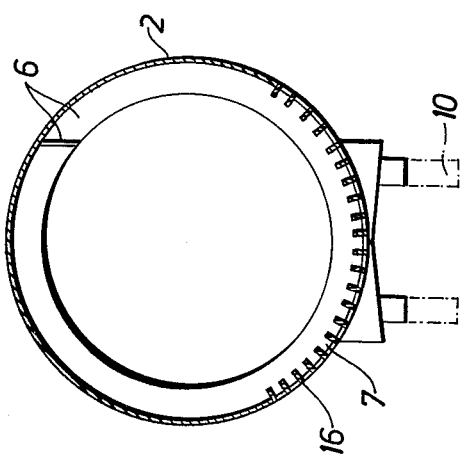
Figure 2:
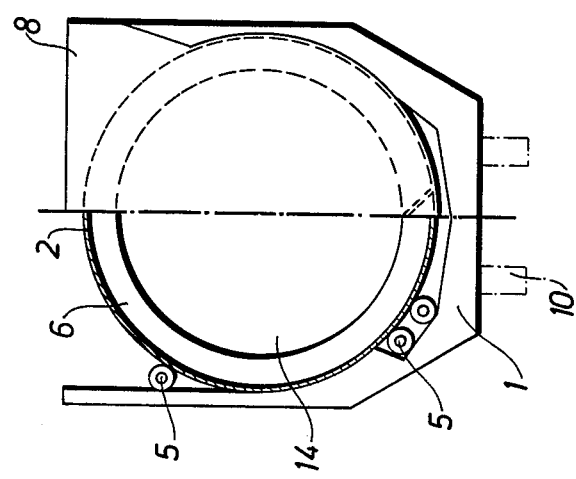

The invention will hereinbelow be described more in detail with reference to the accompanying drawings, which schematically illustrate one embodiment and in which FIG. 1 shows a device according to said embodiment in side view, while FIGS. 2 and 3 are different cross sectional views of the device.

In FIG. 1 there is shown a vehicle of forwarder type with a chassis or frame 10. At the rear portion of the frame there is provided a preferably U-shaped stand 1, which by means of runners or rollers 5 supports the rear end of an elongated circularly cylindrical container 2. At the rear end thereof the container is provided with a charge and discharge opening for stumps and said opening extends substantially across the total internal cross section of the container. At its forward end the container is completely closed by means of an end wall 15 from which a shaft 3 extends, which is rotatably supported in a bearing bracket 13 mounted on the frame of the vehicle and is driven by means of a hydraulic motor 4 via conventional transmission means, which motor may be supplied with pressurized fluid from the hydraulic system of the vehicle.

In the circularly cylindrical container a helically extending cam 6 is provided protruding inwardly from the container wall, said cam extending from a position adjacent the forward end portion of the container to a position adjacent the rear end thereof. Near the front end of the container there is an opening 7 in the container wall, said opening occupying about ⅓ of the periphery of the container wall and being covered by a grid of flat bars 16.

At the rear end of the container a shutter 8 is provided which covers the charge and discharge opening 14 of the container. The shutter is pivotally mounted on the stand 1 adjacent the top end thereof by means of pivots 17 which are substantially horizontal and extend perpendicularly to the longitudinal direction of the container. The shutter is adapted to be swung upwards and downwards by means of a hydraulic cylinders 9. A horizontal section through the shutter 8 at the upper end thereof is U-shaped, whereby an upwardly directed opening 18 is formed, through which stumps may be inserted. After having been dropped through said opening said stumps will slide along the rear wall 19 of the shutter which wall extends obliquely inwards towards the container. Stumps are inserted in this manner by means of a conventional crane 11 mounted on the vehicle and provided with gripping means 12.

The device according to the embodiment illustrated operates in the following manner.

The vehicle is driven across the area where stump extraction has been carried out and the extracted stumps are collected by means of the crane 11 and are loaded through the opening 18 of the shutter 8 into the container 2 which is maintained in rotation by the motor 4 in a direction of rotation such that the cam 6 will feed the stumps in a direction towards the forward end wall 15 of the container. The stumps are accumulated in the forward portion of the container. During the rotation of the container the stumps will partly follow the container in its rotation but due to the gravity forces, which are many times stronger than the centrifugal force on the stumps caused by the rotation of the container, the stumps will always fall back to the bottom of the container, whereby a tumbling effect will be provided, so that the stumps are exposed to shocks and wear against each other and may also be broken apart into smaller pieces. Earth and stones originally adhering to the inserted stumps will be shaken and worn loose and will fall to the bottom of the container and be moved forwardly under the action of the helical cam so as to finally arrive at the opening 7 in the forward end portion of the container and fall out through the grid in said opening, when said opening has arrived in its lower position during the rotation of the container. The container should not be completely filled with stumps, but only half-way or slightly more so that there is a sufficient free space in the container for the stumps to move and fall in the manner described above.

When a sufficient quantity of stumps and stump portions have been introduced into the container the vehicle is driven to a place for unloading the stumps. There the shutter 8 is swung upwardly by means of the hydraulic cylinders 9 and the direction of rotation of the container is reversed and at the same time it may be increased, e.g. doubled. This will result in the stump material being screwed backwards in the container and discharged through the opening 14.

The invention is not restricted to the embodiment illustrated and described, since the latter can be modified and varied in different ways within the scope of the invention.

According to one modification of the embodiment it is possible, in addition to or possibly instead of the opening 7 provided with a grid at the forward portion of the container, to provide openings in the container mantle at other locations thereof, e.g. a plurality of openings or apertures distributed over the whole or a large portion of the mantle surface in a convenient manner, whereby some portions of earth etc. extracted from the stumps can leave the container at an early stage. These openings or apertures may have a length of about 30 to 50 cm, for instance 40 cm, and a width of about 20 to 40 mm, for instance 30 mm, and preferably extend in the longitudinal direction of the container.

It is understood that instead of only one helical cam 6 two or more such cams may be provided at the internal wall of the container, the pitch of said helical cams being substantially steeper than in the case illustrated in which only one cam is provided. In one preferred embodiment the container may have an axial length of about 4 to 5 m, and be provided with three cams, each having a pitch of about one turn per 10 m axial extension.

We claim:

1. A device for collecting and processing extracted tree stumps comprising a container rotably supported on the chassis of a vehicle, said container being adapted to receive a plurality of stumps and being provided with a common opening for loading the stumps into the container and for discharging the stumps therefrom, motor driven means for rotating said container and a plurality of openings in the container wall, distributed over the mantle surface of the container, preferably in the form of slots extending in the longitudinal direction of the container.

2. A device as claimed in claim 1 in which the container is elongated and extends in the longitudinal direction of the vehicle.

3. A device as claimed in claim 2 in which said container is substantially circularly cylindrical in cross section.

4. A device as claimed in claim 3 comprising at least one cam mounted at the internal wall of the container and extending helically along axis of the container, said cam being adapted to displace the stumps longitudinally of the container during the rotation of the container.

5. A device as claimed in claim 1 comprising an opening covered by a grid, through which opening earth, sand, etc. can pass out from the container.

6. A device as claimed in claim 1 in which the opening in the container for introducing and/or discharge of said stumps is located at one end of the container.

7. A device as claimed in claim 6 in which the forward end of the container, as seen in the direction movement of the vehicle, is closed by an end wall and that the opening for introducing stumps into the container is located at the rear end of the container and also forms the discharge opening thereof.

8. A device as claimed in claim 7 comprising a shutter forming an upwardly directed opening for introducing the stumps and adapted to guide stumps introduced from above through said opening into the container, said shutter being movable between a first position in which it closes said opening and a second position in which said opening is exposed.

9. A device as claimed in claim 8 in which the shutter is pivotally supported by the vehicle chassis and is adapted to be actuated by hydraulic drive means for the movement thereof.

10. A device as claimed in claim 7 comprising a shaft connected to and extending from the forward end wall of the container and coupled to said motor driven means, said shaft being supported by a bearing support, mounted at the vehicle chassis.

11. An apparatus for collecting tree stumps and processing same to remove therefrom earth, stones and other undesired loose material, said apparatus comprising a wheeled vehicle, an elongated cylindrical container having two opposite ends and supported by said vehicle so as to be rotatable about an axis extending in the longitudinal direction of said vehicle, said container being adapted to simultaneously accomodate a plurality of tree stumps and being provided at one end thereof with first opening means for charging tree stumps into the container and being further provided, at the mantle thereof with second opening means different than said first opening means for discharging earth, stones and other undesired loose material therefrom, and a motor with transmission means carried by said vehicle for rotating said container about said axis.

12. An apparatus as claimed in claim 11, wherein said second opening means comprises a plurality of slots distributed over the mantle surface of the container and extending in the longitudinal direction of the container, for discharging earth, stones, etc. from the container.

13. An apparatus as claimed in claim 11, in which the forward end of the container, as seen in the direction of forward movement of the vehicle, is closed by an end wall and said first opening means for charging tree stumps into the container is located at the rear end of the container.

14. An apparatus as claimed in claim 11, in which said first opening means for charging tree stumps into the container is adapted to be shifted between a first position for charging tree stumps into the container and a second position for providing a passage for discharging tree stumps therefrom.

15. An apparatus as claimed in claim 14, in which said first opening means for charging tree stumps into the container comprises a shutter forming an upwardly directed opening for introducing tree stumps from above into said shutter, which is adapted to guide the tree stumps into the container.

16. An apparatus as claimed in claim 15, said shutter being pivotally supported by the vehicle chassis and being actuated by hydraulic drive means for shifting the shutter between a tree stump charging position and a tree stump discharging position.

17. An apparatus as claimed in claim 11, comprising a shaft connected to and extending from the forward end of the container and coupled to said motor driven means, said shaft being supported by a bearing support, mounted on the vehicle chassis.

18. An apparatus as claimed in claim 11, comprising at least one cam extending helically along axis of the container, said cam being adapted to displace the tree stumps longitudinally of the container during the rotation of the container.

19. An apparatus as claimed in claim 11, wherein said second opening means in the mantle of the container is covered by a grid for discharging earth, stones, etc. from the container.

* * * * *